Figure 1:
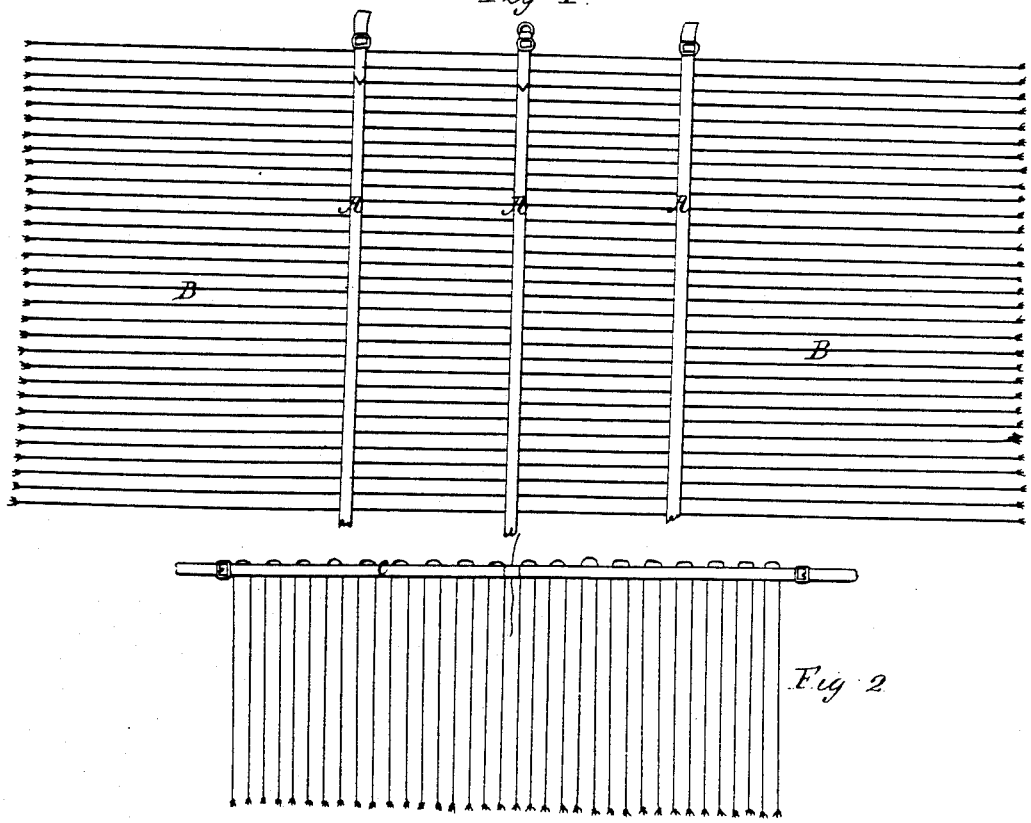
Figure 2:
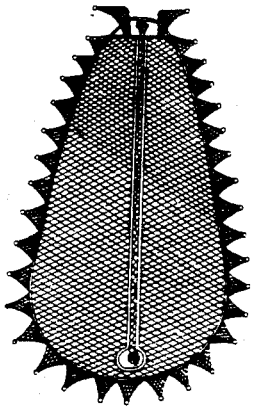
Figure 2:
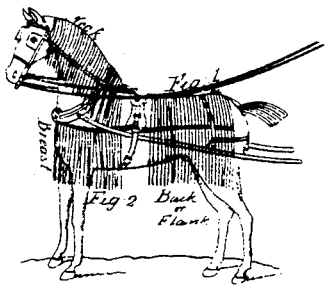

54-30.4 EX
H6682 OR X 5,649

H. Korn,

Fly Net,

5649*

Patented Sep. 12. 1829.

Side view

N. PETERS PHOTO-LITHOGRAPHER WASHINGTON D.C.

United States Patent Office

PTO - BOYERS, PA Duty Station

MISSING PAGE TEMPORARY NOTICE

PATENT # 5649 X FOR ISSUE DATE 9-12-1829

HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

pg 2 thru end

Data Conversion Operation

Boyers, Pa